Dec. 22, 1953    A. K. HINCHMAN    2,663,509
MOTION-PICTURE FILM WINDER
Filed July 21, 1949
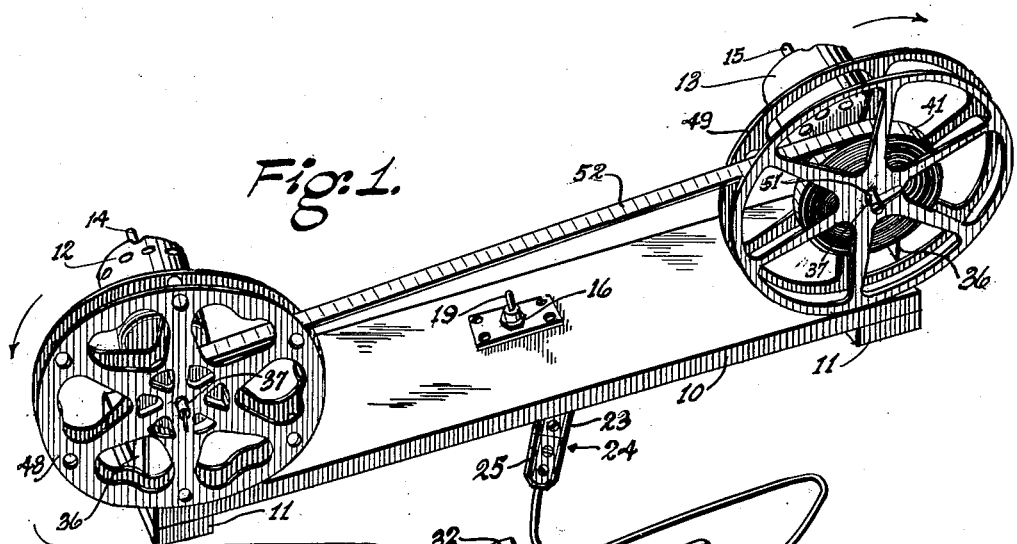
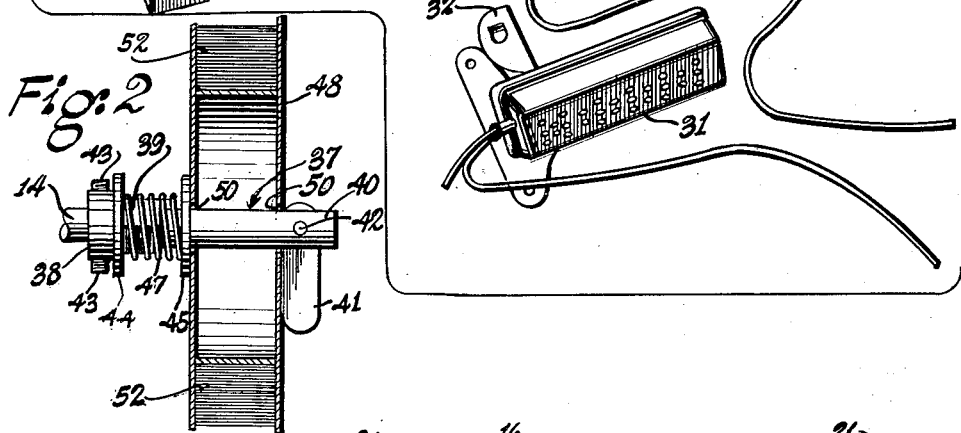
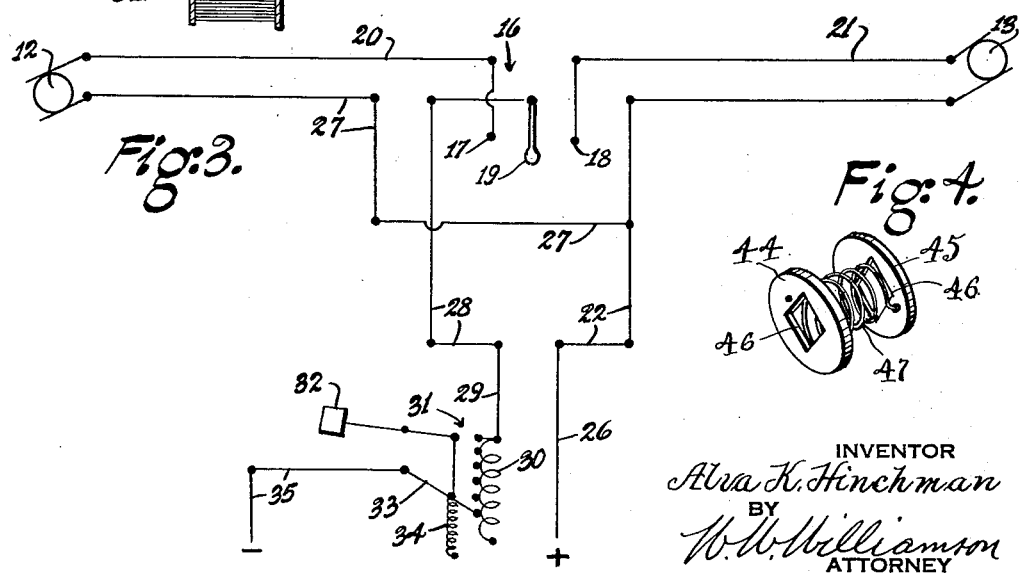
INVENTOR
Alva K. Hinchman
BY
W. W. Williamson
ATTORNEY Patented Dec. 22, 1953

2,663,509

UNITED STATES PATENT OFFICE 2,663,509

MOTION-PICTURE FILM WINDER

Alva K. Hinchman, Bryn Mawr, Pa.

Application July 21, 1949, Serial No. 106,051

1 Claim. (Cl. 242—55)

My invention relates to a new and useful motion picture film winder and has for one of its objects to provide an exceedingly simple and effective device of this character for quickly transferring a film from one reel to another.

In the motion picture industry it is often necessary to transfer a film from one reel to another and this is particularly true in that branch of the industry where films are rented to customers who use a film for only one showing thereof and return such film to the party renting out the same. In such a case, the customer often fails to rewind the film onto the original reel and therefore it is in reverse position and must be transferred to another reel prior to the next exhibition. Heretofore the rewinding has been done on a hand-operated device which is a relatively slow process and the reel containing the film in reverse is free to revolve after being initially started which often results in a portion of the film sagging and contacting adjacent surfaces causing scratches or other damage to the film. Therefore another object of the present invention is to provide a film winder which will eliminate the above mentioned disadvantages by constructing the apparatus so that it may be electrically driven for fast action and reversible at any time during the winding operations as well as providing a drag or brake-like action on the reel from which the film is being withdrawn.

Another object of this invention is to provide a film winder consisting of a base member having two electric motors thereon, one motor running clockwise and the other counterclockwise, connected to a two-way switch whereby either motor may be actuated as desired, and the electric circuit having a rheostat interposed therein controlling the speed of the motor being operated.

A further object of the invention is to provide a universal reel holder and latch which will support reels of different sizes, such as 8, 16 and 32 millimeters, and those having different shaped hub bearings, such as round, rectangular or combinations of both configurations.

A still further object of the invention is to provide a reel holder and latch for detachable mounting on either or both ends of a motor shaft which projects from both ends of the motor casing.

With the above and other objects in view this invention consists of the details of construction and combination of elements hereinafter set forth and then designated by the claim.

In order that those skilled in the art to which this invention appertains may understand how to make and use the same I will describe its construction in detail referring by numerals to the accompanying drawing forming a part hereof in which:

Fig. 1 is a perspective view of a film winder constructed according to my invention and a foot operated rheostat associated therewith.

Fig. 2 is an enlarged elevation of one of the reel holders mounted on a motor shaft which is partly broken away and showing a part of one type of reel in section held in place on the reel holder.

Fig. 3 is a diagrammatic view of the electrical circuit.

Fig. 4 is a perspective view of the resilient spacing means.

In carrying out my invention as herein embodied 10 represents a base member or panel of suitable material and convenient length, width and, preferably, provided with feet 11.

On top of the base member 10 are mounted two motors 12 and 13, one adjacent each end of said base member. These motors are known in the trade as double-end motors in that the shaft of each one projects from both ends of the casing. The shafts are numbered 14 and 15, respectively, and one end of each, preferably but not necessarily, extends beyond one of the longer side edges of the base member.

These motors are in reverse positions to one another, that is, what might be considered as the front end of one motor faces the near side longer edge of the base member as shown in Fig. 1 and what may be considered the rear end of the other motor faces the same longer edge of said base member. With the motors thus mounted and arranged the end of the shaft 14 carrying the reel holder to be presently described revolves counterclockwise during operation while the similar end of shaft 13 revolves clockwise.

An ordinary two-way switch 16 includes two contacts 17 and 18 and a switch lever 19, Fig. 3. One contact, as 17, is connected by a conductor 20 with one side of the motor 12 and the other contact 18 of the switch is connected by a conductor 21 with one side of the other motor 13. The other side of said other motor 13 is connected by a conductor 22 to a terminal (not shown) within the socket member 23, Fig. 1, of a separable connector 24 also including the plug member 25 and said conductor 22 forms one portion of one side of an electric circuit finally connected with a source of current and another portion of said one side of the circuit is the conductor 26, Fig. 3, attached to the plug member 25 of said separable connector 24. The other side of the first mentioned motor 17 is connected by a conductor 27 with the conductor 22.

The switch blade 19 of the two-way switch 16 is connected by a conductor 28, Fig. 3, to a second terminal (not shown) within said socket member 23, Fig. 1, of said separable connector 24 and said conductor 28 forms one portion of the other side of the electric circuit finally connected with the source of current. Another of said other side of the circuit is the conductor 29, Fig. 3, attached to the plug member 25 of said separable connector 24 and connected to the resistance 30, Fig. 3, of the rheostat 31, Fig. 1, preferably of the foot operated type, for which a treadle 32 is provided.

Attached to the treadle for operation in one direction is a contact lever 33 which slidably engages the resistance 30 and said contact lever is urged in the opposite direction by a spring 34. A conductor 35 is connected with the contact lever 33 and the source of current and also forms a portion of said other side of the circuit in which is included the aforementioned conductors 28 and 29, and the resistance 30 and contact lever 33 of the rheostat 31.

From the foregoing it will be apparent that when the switch blade 19 is engaged with the contact 17 the motor 12 will be in circuit for operation and when the switch blade is engaged with the contact 18 the motor 13 will be in circuit for operation, whereas when said switch blade is in a neutral position neither motor can be operated. When either motor is in circuit the operation of the rheostat will cause that motor which is in circuit to run and at any desired speed within its minimum and maximum rates.

The conductors between the switch, motors and socket member 23 of the separable connector 24 may all be located against the underneath face of the base member 10 except where they pass through the latter for attachment to the motors which are located a distance above the top surface of said base member on mounting brackets 36, Fig. 1.

A reel holder 37, Fig. 2, is mounted on what will be referred to as the front end of each motor shaft when considered relative to the complete apparatus, the same being the near ends of the device as depicted in Fig. 1. Each reel holder 37 includes an integral journal member consisting of a collar 38, a neck 39, square in cross section, and a trunnion 40 which is bifurcated at its outer end to receive the swinging latch 41 mounted on a pivot 42 fixed in the trunnion across the slot of the bifurcated end. This journal member has a socket in its inner end so that said journal member may be slipped over the end of a motor shaft and detachably held in place by set screws 43.

On the journal member is mounted a resilient spacing means, Figs. 2 and 4, composed of two discs 44 and 45, each with a square central hole 46 of a size to snugly fit the square neck 39 of said journal member and said discs are fastened to opposite ends of a coil spring 47 with the holes in substantially constant alignment. Ordinarily one disc is to remain on the square neck and against the collar 38 while the other disc is urged outwardly relative to the journal member 37. As the holes in the discs are in alignment and the inner disc is positioned on the square neck by the square hole of said inner disc, the outer disc will telescope onto said square neck when forced inwardly against the action of the spring a sufficient distance to engage said neck.

Two types of reels 48 and 49 are illustrated in Fig. 1, the one numbered 48 having round hub bearings 50, and the other provided with square hub bearings 51, Fig. 1. In many instances one or more radial notches extend from the edge of the hub bearing opening. A suitable reel having at least one square bearing can be placed on the reel holder, while the latch 41 is turned to a position axially of the trunnion, and pushed back to contact the spacing means so the hub bearing passes onto the square neck. Then the latch 41 is swung over so as to engage the contiguous face of the reel which will hold the latter in place to revolve with the reel holder and its motor shaft.

A reel having a round hub bearing is similarly mounted and the tension of the resilient spacing means will cause such a reel to revolve with the reel holder and if the reel has a notch which, generally is the case, the tail end of the latch 41 can be entered into said notch and the reel will be positively connected to the reel holder.

In practice, when winding a motion picture film 52 from one reel to another, as from reel 49 to reel 48, Fig. 1, the switch lever 19 is moved to the left which will place motor 12 in the electric circuit. Thereafter, by operating the rheostat 31 the speed of said motor will be controlled thereby regulating the speed at which the film is wound onto the reel 48. The reel 49 being mounted on the reel holder connected to the motor 13 will be retarded so that, in effect, the film is under the influence of a brake action to prevent said film from sagging or flapping about which might cause damage thereto.

During the winding operation, should the operator notice a defect or damaged place in the film said operator may, without changing the position of the rheostat contact lever, stop the motor 12 and, if necessary, start the motor 13 to back the film until the damaged part is returned to the space between the two reels and then said motor 13 can be stopped. This will give the operator an opportunity to more closely examine the film and make repairs if necessary.

Of course I do not wish to be limited to the exact details of construction herein shown and described as these may be varied within the scope of the appended claim without departing from the spirit of my invention.

Having described my invention what I claim as new and useful is:

In a motion picture film winder, a reel holder for detachable mounting on the end of a revolvable shaft and comprising a collar slidable over the shaft, a substantially square neck projecting from an end of said collar, a trunnion extending from the end of said neck opposite the collar, a resilient spacing means composed of a pair of discs having substantially aligned central square holes to snugly fit the square neck and a coil spring having each end secured to one of said discs, and a holding means on the distal end of said trunnion to engage a reel mounted on the trunnion in engagement with the resilient spacing means.

ALVA K. HINCHMAN.

References Cited in the file of this patent
UNITED STATES PATENTS

| Number | Name | Date |
| --- | --- | --- |
| 771,280 | Smith | Oct. 4, 1904 |
| 1,713,277 | Goldberg et al. | May 14, 1929 |
| 1,775,610 | Weiss | Sept. 9, 1930 |
| 1,820,731 | Dainow | Aug. 25, 1931 |
| 2,048,382 | Holden | July 21, 1936 |
| 2,064,088 | Stechbart | Dec. 15, 1936 |
| 2,412,551 | Pratt | Dec. 10, 1946 |
| 2,537,263 | Fogle | Jan. 9, 1951 |

FOREIGN PATENTS

| Number | Country | Date |
| --- | --- | --- |
| 459,035 | Great Britain | Dec. 31, 1936 |